M. NACE.
TIRE TREAD.
APPLICATION FILED NOV. 29, 1915.
1,226,358.
Patented May 15, 1917.
2 SHEETS—SHEET 1.
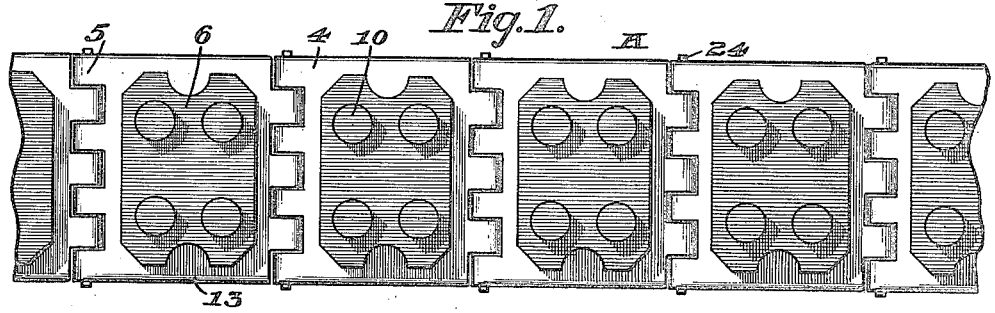
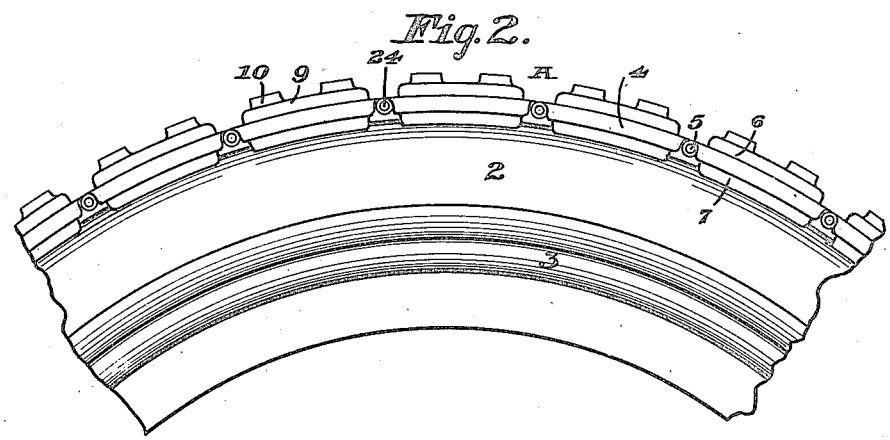
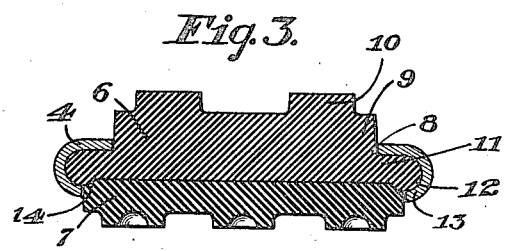
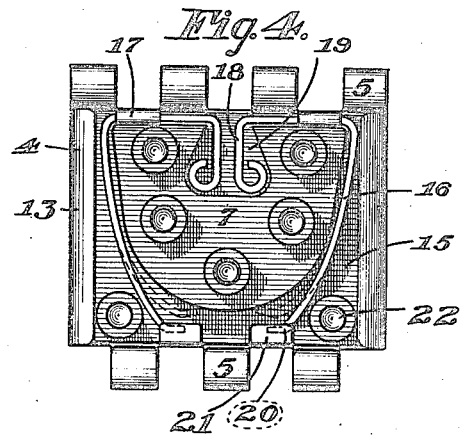
WITNESSES:
B. M. Doolin
L. J. Forde
INVENTOR
Mabelle Nace.
BY Strong Downsend
ATTORNEYS

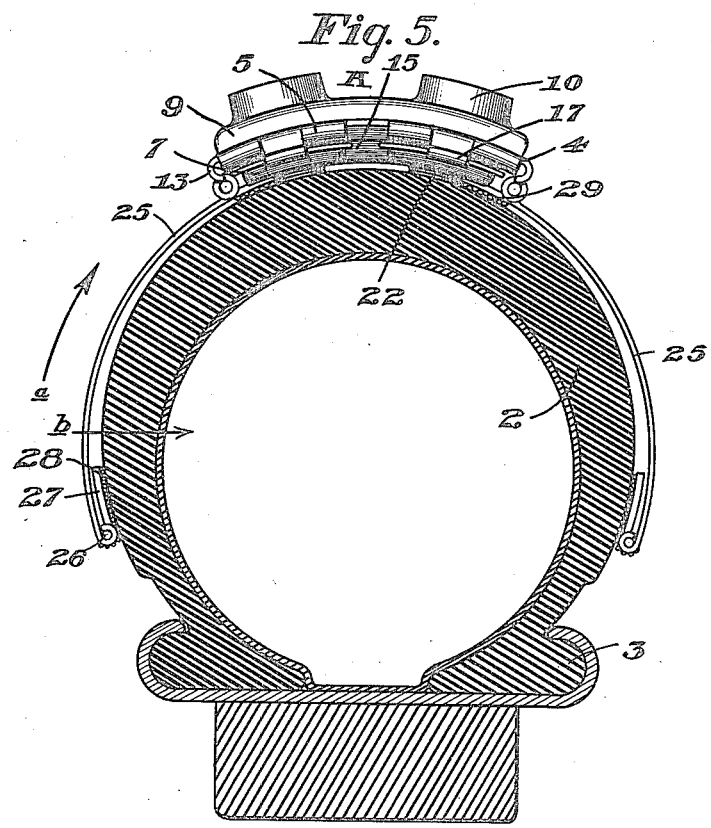
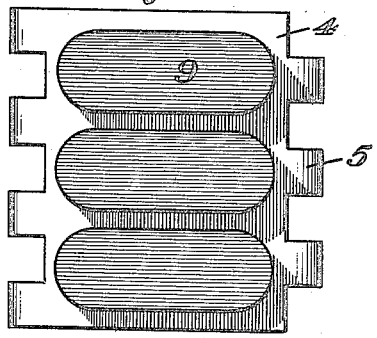

UNITED STATES PATENT OFFICE.

MABELLE NACE, OF PIEDMONT, CALIFORNIA.

TIRE-TREAD.

1,226,358.  Specification of Letters Patent.  Patented May 15, 1917.

Application filed November 29, 1915. Serial No. 63,943.

*To all whom it may concern:*

Be it known that I, MABELLE NACE, a citizen of the United States, residing at Piedmont, in the county of Alameda and State of California, have invented a new and useful Improvement in Tire-Treads, of which the following is a specification.

This invention relates to a tire tread and armor for vehicle tires.

One of the objects of the present invention is to provide a simple, substantial, cheaply manufactured tread and armor for vehicle tires, particularly of the pneumatic type, constructed to surround the tire like a flexible ring and to be secured so that it may be quickly applied or removed by inflation or deflation of the tire. Another object of the invention is to construct the tread and armor sections to permit removal or renewal of parts as wear or other conditions may demand. Further objects will hereinafter appear.

The invention consists of the parts and construction and combination of parts, as hereinafter more fully described and claimed, having reference to the accompanying drawings, in which—

Figure 1 is a plan view of the tire tread.

Fig. 2 is a side elevation, showing its application to a pneumatic tire.

Fig. 3 is an enlarged cross section of the tire tread.

Fig. 4 is an enlarged bottom view of the tread section.

Fig. 5 is a cross section of the tire, showing the tread applied and also showing means for securing the same against movement on the tire.

Fig. 6 is a plan view of a tread member, showing a modification.

Referring to the drawings in detail A indicates in general, the tire tread and armor forming the subject matter of the present application; 2 a standard form of pneumatic tire to which it is applied; and 3 the clencher which secures the tire to the wheel. The tread is adapted to be applied to any size tire and is in this instance shown as constructed of metal plates 4 hingedly connected, as at 5 to permit the greatest flexibility possible when passing over irregularities on the road surface. Each tread member consists of a plate or holder 4 and outer tread members 6 and an inner tread member 7. They are preferably constructed of rubber and are secured in the plate or holder in the following manner:

Each plate is provided with an opening 8, of suitable shape through which the raised portion 9, formed on the tread member 6, projects to form a wearing face on the tread and also to prevent contact of the plate with the road surface. The face of the tread projection 9 may be provided with projections or nobs 10 of any suitable shape to produce a non-skid surface and also to increase tractive efficiency.

The base portion of the tread member 6 is extended, as at 11 and the side edges are rounded or rolled, as at 12 to reinforce and strengthen the base portion 11 of the tread member. The side edges of the plate are flanged and rounded, as at 13 to receive the reinforced edges 12 of the tread member, thus securing same against removal through the opening 8. The lower tread member 7 forms a lock for the outer tread member 6, inasmuch as its outer edges are slightly concaved, as at 14 to receive the lower rounded reinforced edges 12. The face of the inner tread member 7 or that side which contacts with the tire 2 is preferably depressed, as indicated at 15 to receive a pair of spring arms or clips 16 which are pivotally mounted, as at 17 in hinges formed on the lower side of the plate or holder 4. Each clip 16 is bent to form two arms, a short arm 18 which projects into a pocket 19 formed on the lower face of the tread member 7, and a long arm 16 which rests in the depression 15. The outer end of arm 16 is turned at right angles, as at 20 to permit it to be forced under an inwardly projecting lug 21, formed on the lower side of the plate. Each clip member 16 is similarly constructed, the description of one, therefore, applies to both. Also formed on the lower face of the tread members 7 are a plurality of suction cups 22. These together with the grooves 15 and pocket 19 form the means whereby the tread members are secured upon the tire. The pressure of the tire caused by inflation causes the surface to embed itself in the grooves, cups and depressions and a perfect grip or lock between the same is in this manner secured.

The hinges 5 made on the end of each link are offset with relation to each other, so that they interlock when assembled, a pin 24 is then placed through the alined hinges, thus forming a perfect connection between each plate or holder, which not only provides the mechanical strength desired, but also permits independent movement of one link with relation to another about the pivotal or hinge-like connection formed.

The holders or plates 4 are preferably constructed of steel and the separable tread members secured in same of rubber. These materials may, however, be changed to suit conditions and local demand. Metal links or holders 4 may also be added or taken out, thus making it possible to fit any size tire and any pressure can be had to secure the tread members on the tire by applying the tread when the tire is perfectly flat or partially deflated. The pressure caused by inflation of the tire will, as before described cause the face of the tire to thoroughly embed itself in the grooves and vacuum cups, formed on the lower or inner side of the tread members, thus forming the desired or necessary grip between the tire and tread.

By referring to Fig. 5, it will be seen that two clip-like spring arms 25 have been provided; these are only applied in certain instances for the purpose of securing the tread against accidental removal with relation to the tire.

A grip between arms 25 and the tire is formed by pivotally mounting, as at 26 roughened shoes 27; the hinges of these shoes may either be corrugated or provided with teeth 28 which engage the side of the tire. These hinges act as a means for insuring a more thorough grip between the shoe and the tire; this can be seen by referring to Fig. 5, as the tread section pulls on arm 25 in the direction of arrow $a$, it will be seen that the teeth 28 engage the face of the tire and will consequently pull the shoe inwardly in the direction of arrow $b$. Similar shoes 29 may be applied under each tread member, if desired.

The actual shape of the tread projections 9 may be varied. One shape is shown in Fig. 1 and another in Fig. 6. These figures show that a great variety or shape of projections may be formed.

In operation with the tread applied, it will be seen that the cups 10 or tread projections 6 are the only parts of the tread which come in contact with the road surface, all wear is thus taken off the tire proper, as this does not contact with the road surface.

The only expense will be the replacing from time to time of the outer tread sections 6, as these wear down. These are, therefore, removably mounted, as shown in Figs. 3 and 4, and this is accomplished as follows:

The flexible tread ring is first removed by deflating the tire 2. Arms 16 are then moved inwardly into the dotted line position shown until the outer ends are moved out of engagement with lugs 21; they are then swung back on their hinges 17 and will in this manner permit the lower tread section 7 to be lifted out and removed. The outer worn tread section 6 is then removed by forcing the reinforced edges 12 out of the flanges 13 on the holder. A new tread section 6 is then inserted and the same inner tread section 7 replaced and locked in position by arms or clips 16. The inner tread members 7 are subject to little wear and are practically speaking everlasting; their only function being to form a grip between the tire proper and the tread ring and to serve as cushion members or spacers between the plate and the tire.

While the tread is here shown as constructed of a plurality of hinged plates or links 4, it is obvious that various changes may be embodied in the construction.

The materials and finish of the several parts of the device are otherwise such as the judgment and experience of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. The combination with a tire, of a plurality of connected plate members surrounding the tire, a tread member projecting outwardly through each plate and removable by inward movement, a cushion member interposed between each plate and the tire, and clips on each plate securing each cushion member against its respective tread member.

2. An applied tread for an automobile tire comprising a sectional ring or band to encircle the tire, each section of the ring or band having an opening, an insertible and readily removable tread member insertible through the opening of a section from the inside of the ring to present an outward tread portion, and said insert held against the tire by said encircling band or ring, and spring clips carried on the inside of the sections engaging the inner sides of the inserts.

3. A tire tread comprising, in its entirety, a sectional body, each section of which consists of a holder plate having an opening, a flanged outer tread member projecting through the opening with its flange abutting the plate, and an inner tread member arranged immediately next to the outer tread member in direct contacting relation therewith.

4. A tread section comprising a plate, a cushion member removably carried thereby, a spring clip hinged to one side of the plate for swinging across the cushion member to hold the latter to the plate, and a keeper on the opposite side of the plate with which the clip engages when operative.

5. In combination with a tire and an encircling tread band, of lateral clip-like spring arms carried by the band and embracing the sides of the tire, and roughened shoes carried by the terminals of the arms between the latter and the tire.

In testimony whereof I have hereunto set my hand in the presence of two subscribing witnesses.

MABELLE NACE.

Witnesses:
TRAYLOR W. BELL,
STANLEY J. SMITH.